March 25, 1969     H. G. SKINNER     3,434,694

VALVE MECHANISMS

Filed March 30, 1966     Sheet 1 of 3

INVENTOR.
HARVEY G. SKINNER his ATTORNEYS

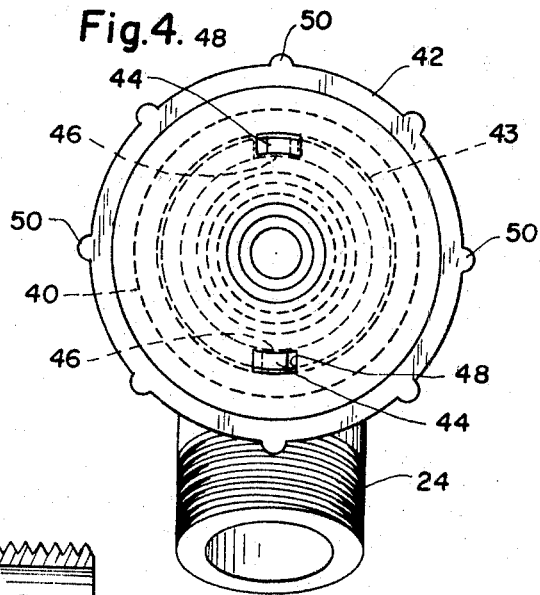
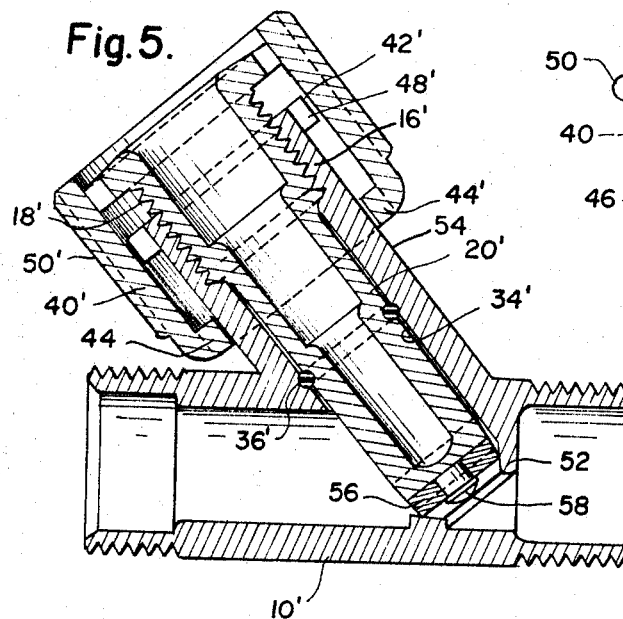
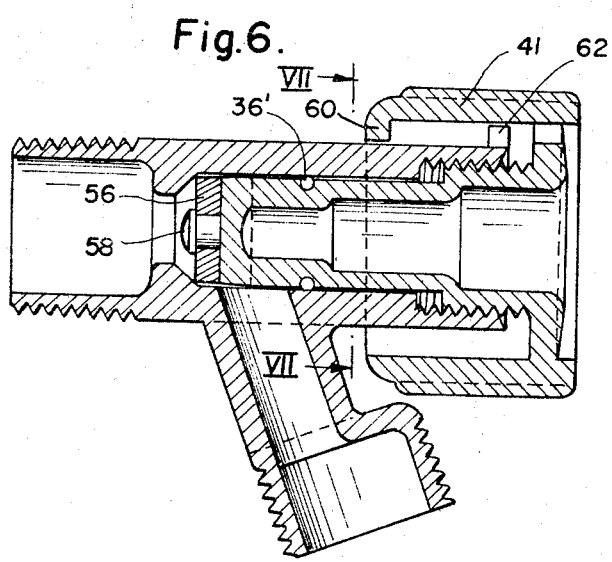
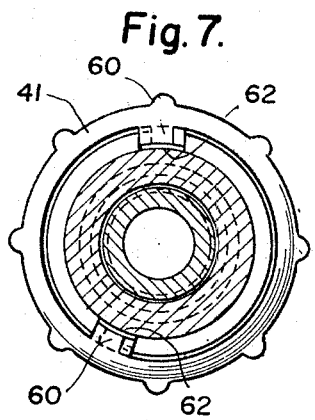

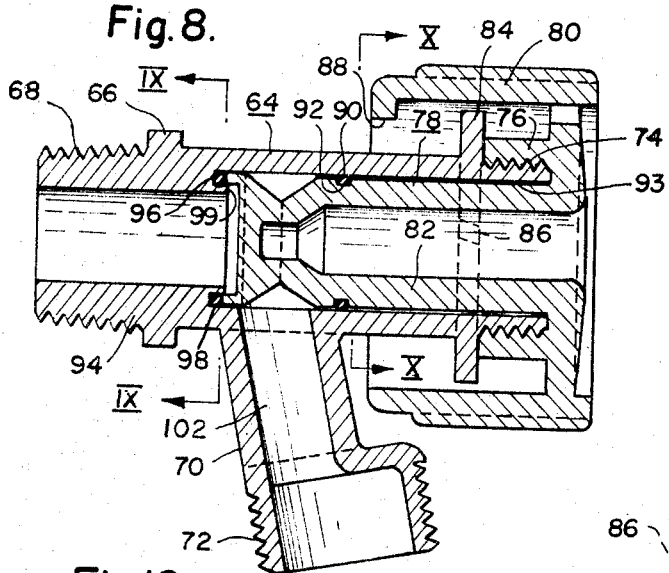
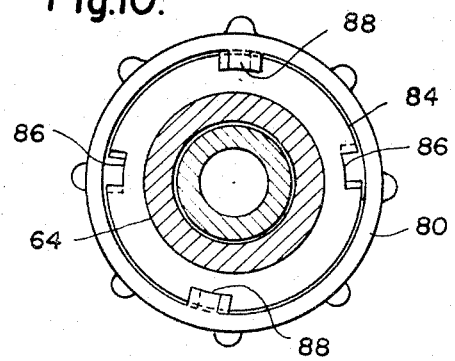
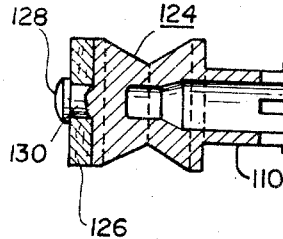
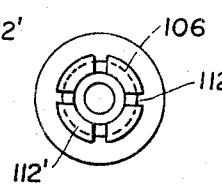
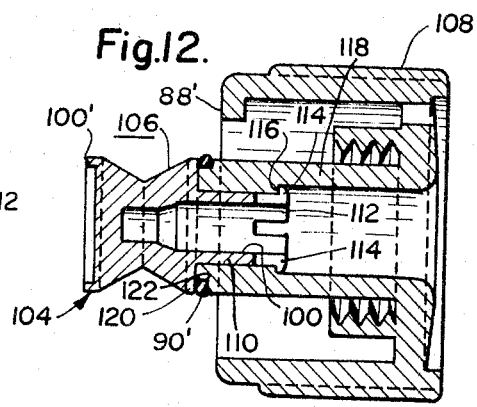
INVENTOR.
HARVEY G. SKINNER

United States Patent Office 3,434,694
Patented Mar. 25, 1969

3,434,694
VALVE MECHANISMS
Harvey G. Skinner, Ligonier, Pa., assignor, by mesne assignments, to Westmoreland Plastics Company, Latrobe, Pa., a corporation of Pennsylvania
Filed Mar. 30, 1966, Ser. No. 538,745
Int. Cl. F16k *1/04, 1/32*
U.S. Cl. 251—215    12 Claims

ABSTRACT OF THE DISCLOSURE

I disclose, in a valve, the combination comprising a generally tubular body member having a valve seating surface therein and a cylindrical portion adjacent to and communicating with said surface, a handle and stem component having its stem portion relatively closely fitted within said cylindrical portion, and threadedly engaged therewith, said handle and stem component having valve seat engaging and sealing means on the inward end thereof and a skirt portion disposable coaxially of and loosely surrounding the outward end portion of said cylindrical portion and said body member, said body member having a retaining flange mounted on said outer cylindrical end portion and enclosable within said skirt portion, and releasable detent means cooperatively formed on said skirt and on said retaining flange for releasably retaining said valve stem within said cylindrical portion.

---

The present invention relates generally to compact valve mechanism, and more particularly to drain valves of the character described for draining hot water and similar storage tanks.

Previous drain valves usually required the use of special tools for installing and removing the valve and for disassembling the component parts thereof for cleaning and/or replacement or the like. Many valves which are presently available in this category, in an attempt to eliminate the use of such tools, are arranged such that the parts thereof can be inadvertently completely threaded or otherwise separated during operation of the valve, thereby resulting in loss of water or other fluid contained in the storage tanks and in possible injury to the operator. Other types of available valves require a relatively large number of component parts which suffer from the further disadvantage of being fabricated from metallic structural materials which are particularly subject to electrolytic action and chemical corrosion with their attendant disadvantages.

Previous attempts to eliminate electrolytic and related problems have resulted in the provision of a combination metal and plastic valve structure which not only did not completely eliminate these problems but also was expensive to manufacture as a result of the requirement of plastic lined metal parts.

Known types of drain and similar valves, moreover, usually utilize relatively hard or rigid materials for the valve seats thereof and therefore they are particularly subject to leakage as a result of corrosion encountered in most applications of valves and also as a result of erosion as when the valve member inadvertently is not completely seated. This problem is overcome in certain forms of the present invention by the provision of resilient valve seat means or by the provision of means in other forms of the invention for resurfacing the engaging surfaces of the valve seat and valve member.

The aforementioned electrolytic condition and the related corrosion and erosion problems of the prior art are overcome in the present invention with the provision of a novel and efficient one-piece molded plastic body and valve seat, which cooperates with a unique molded one-piece handle and valve stem assembly. In other arrangements of the handle-stem assembly, the latter is assembled from snap-in or quick-attach components. Novel detent means are formed cooperatively on the valve body and handle-stem component to maintain these components together in an essentially leak-proof assembly in the event that these components are inadvertently separated, as by completely unthreading their threaded connection. Finally, the drain valve of the invention can be readily disassembled for cleaning or the like simply by separating the aforementioned detent means when desired and removing the valve handle and stem component from the valve body. This is accomplished in accordance with the invention without the use of tools.

These and other objects, features and advantages of the invention will be elaborated upon during the forthcoming description of presently preferred embodiments of the invention together with preferred methods of practicing the same.

In the accompanying drawings there are illustrated certain presently preferred forms of the invention and preferred methods of practicing the same, wherein:

FIGURE 4 is a front or handle end elevational view of the drain valve shown in the preceding figures;

FIGURE 5 is a longitudinally sectioned view of another form of drain valve arranged in accordance with the invention;

FIGURE 6 is a longitudinally sectioned view of still another form of valve arranged in accordance with the invention;

FIGURE 7 is a cross-sectional view of the valve arrangement of FIGURE 6 taken along reference line 7—7 thereof;

FIGURE 8 is a longitudinally sectioned view of still another form of drain valve arranged in accordance with the invention;

FIGURE 9 is a cross-sectional view of the valve shown in FIGURE 8 and taken along reference line 9—9 thereof;

FIGURE 10 is a cross-sectional view of the valve shown in FIGURE 8 and taken along reference line 10—10 thereof;

FIGURE 11 is an end elevational view of the valve structure as shown in FIGURES 8–10;

FIGURE 12 is a longitudinally sectioned view of another form of valve handle and stem assembly suitable for use with the valve body shown in FIGURES 8–10;

FIGURE 13 is a modified form of a replaceable valve stem member adapted for use in the handle assembly of FIGURE 12; and FIGURE 14 is an end elevational view of the valve stem member shown in FIGURE 13.

Figure 1:
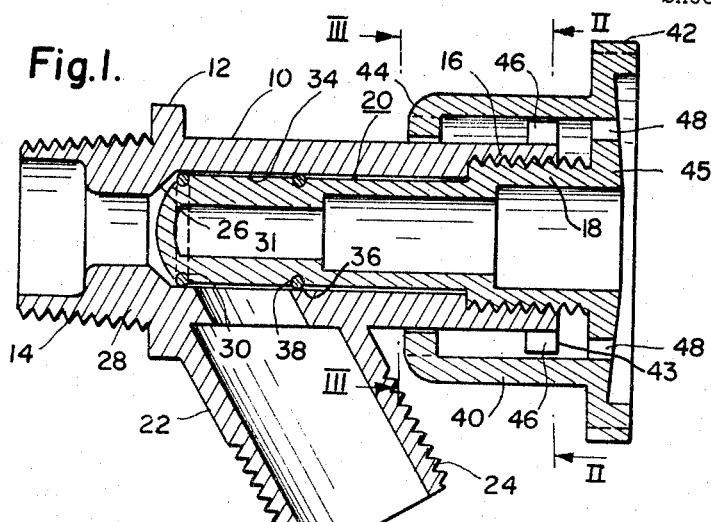
FIGURE 1 is a longitudinally sectioned view of one form of molded plastic valve arranged in accordance with the invention.

Referring now more particularly to FIGURES 1–4 of the drawings, the exemplary form of the invention shown therein includes a one-piece molded plastic valve body 10 having in this arrangement an integrally molded mounting nut 12 for use in installing the valve. The mounting nut 12 is provided with a suitable wrench configuration and in this example is octagonally shaped as better shown in FIGURE 2 of the drawings. Desirably, the inlet end of the valve body 10 is provided with a standard pipe thread denoted by reference character 14. The other end of the valve body is internally threaded as denoted by reference character 16 for engagement with threaded portion 18 of a one-piece molded plastic handle and valve stem component 20. In this arrangement the valve body 10 is further provided, if desired, with a conventional thread configuration such as a male garden hose thread 24.

The frusto-coincal valve seat 26 is formed at a thickened portion or constriction 28 within the valve body 10 and is positioned adjacent the inlet end of the valve body. In this example the valve seat 26 cooperates with a resilient member such as O-ring 30 mounted on the inner end portion of the handle and valve stem member 20. The circumferentially extending groove 31 for the O-ring 30 has its opening canted toward the frustoconical valve seat 26 to facilitate sealing engagement therewith. The resilient character of the O-ring seating member 30 prevents wear of the valve seat 26 and the seating member 30, and also ensures an effective seal therebetween.

The valve stem portion 32 of the stem and handle component fits relatively closely within the cylindrical bore 34 of the valve body and is provided with a second O-ring seal 36 which is mounted in groove 38 therefor spaced from the valve seating O-ring 30. The second O-ring seal 38 sealingly engages the cylindrical bore of the valve body 10, at all times, while the stem and handle component is operatively engaged in the valve body 10, to prevent weepage from the front or handle end of the valve body.

In the event that the valve of FIGURES 1–4 is inadvertently opened too far, thereby unthreading the normally threadedly engaged portions 16 and 18 of the valve body 10 and the handle-stem 20 respectively, means are provided for maintaining the handle-stem 20 within the valve body 10 against the pressure of water or other fluid in the system in which the valve is installed. Such means maintains the weepage seal 36 in engagement with the cylindrical bore 34 of the body 10 although the aforementioned threaded portions 16, 18 had become disengaged.

One arrangement of such means, in accordance with the invention, includes the provision of a skirt 40 which coaxially surrounds the threaded portion 18 of the handle-stem component 20. In this example the skirt 40 is integrally molded at the rear surface of handle portion 42, which in turn is integrally molded with the threaded portion 18 of the handle-stem 20. The handle-stem skirt 40, however, projects rearwardly of the adjacent end of the stem threaded portion 18 in order to accommodate therebetween a retaining flange 43 which is integrally molded with the valve body 10, as better shown in FIGURES 1 and 2 of the drawings, when the threaded portions 16, 18 are disposed adjacently but disengaged, as better shown in FIGURE 1A. In the latter positional relationship of the handle-stem 20 and the valve body 10 it will be seen that the weepage seal or O-ring 36 and its groove 38 are sufficiently axially displaced toward the valve seat 26 from the adjacent end of the skirt 40 that the O-ring 36 remains in sealing contact with the cylindrical bore 34 of the valve body 10.

Figure 1A:
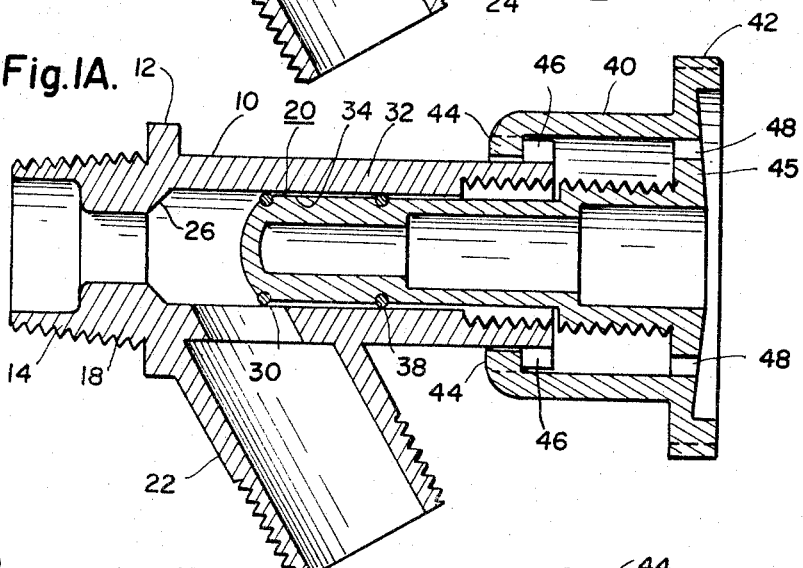
FIGURE 1A is a similar view of the valve shown in FIGURE 1 and illustrating the operation of the detent means thereof.
Figure 2:
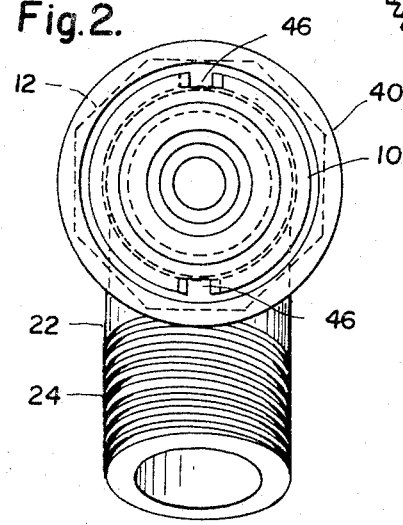
FIGURE 2 is a cross-sectional view of the drain valve shown in FIGURE 1 and taken along reference line 2—2 thereof.
Figure 3:
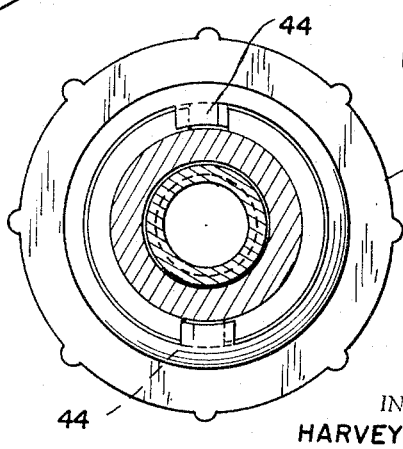
FIGURE 3 is a cross-sectional view of the drain valve shown in FIGURE 1 and taken along reference line 3—3 thereof.

When the valve stem-handle 20 is positioned as shown in FIGURE 1A, it is retained in the valve body 10 by the engagement of a pair of lugs 44 with the adjacent surface of the valve body retaining flange 43. In this example the retaining lugs 44 are diametrically opposed and the threads of the cooperating threaded portions 16 and 18 of the valve body 10 and the handle-stem 20 are initiated such that upon disengagement thereof the handle-stem 20 is rotationally disposed relative to the valve body 10 such that the lugs 44 are angularly displaced from a pair of lug receiving slots 46 which are likewise diametrically opposed in the valve body retaining flange 43, as better shown in FIGURES 2 and 3 of the drawings.

As a further precaution against the inadvertent removal of the handle stem component 20 from the valve body 10, the retaining lugs 44 and the retaining flange slots 46 are canted or disposed along helical paths so that when the lugs 44 are aligned with the retaining flange slots 46 a slight turning of the handle portion 43 is required to move the lugs 44 through the slots 46. With this arrangement the handle-stem 20 can be quickly and easily removed from the valve body 10, without the use of tools for purposes of cleaning the interior portions of the valve or for replacing the O-rings 30 and 36, which replacement likewise does not require the use of tools in contrast to the usual bothersome task of replacing conventional valve washers. In order to facilitate the alignment of the skirt lugs 44 with the retaining flange slots 46, the valve handle portion 45 is provided with a pair of sight openings 48 which are axially aligned with the lugs 44 to provide visual access thereto from the front or handle end of the valve. As better shown in FIGURE 4, the valve handle portion 43 is further provided with a number of circumferentially spaced finger grips 50 to aid in grasping and turning the handle portion 42.

Referring now to FIGURE 5 of the drawings, a similar two-piece plastic valve arrangement is illustrated. In the latter form of the invention, the valve is arranged as a flow-through type valve with the handle-stem component 20' mounted as a side operator. To cooperate with the thus angularly disposed handle-stem 20', a diagonally disposed, frusto-conical valve seat 52 is formed in valve body 10' adjacent the inlet end thereof. To receive the handle-stem 20' the valve body 10' is provided with a side valve stem housing 54 which is coaxially aligned with the diagonal valve seat 52. The valve stem housing 54 is provided with a threaded portion 16' and retaining flange 42' which cooperate with the handle-stem thread portion 18' and handle skirt 40' in the manner described above in connection with FIGURES 1–4. In this arrangement, however, the handle skirt 40' is aligned with the outer periphery of the handle portion so as to form an axial extension of the handle portion. To provide better grippage, the finger grips 50' are likewise axially extended so as ot lie along the major proportion of the skirt periphery.

For sealing cooperation with the diagonal valve seat 52, the inward end of the handle-stem 20' is provided with a suitable flat-type washer 56. The washer 56 can be of conventional construction and secured to the adjacent end of the handle-stem by means of a mounting screw 58.

It will be seen that the flat washer 56 seats peripherally edgewise against the valve seat 52, owing to the frusto-conical configuration thereof, rather than with its flat surface against the usual peripheral ridge of a conventional valve seat. Thus a wearing surface at the lower edge of the washer 56 is presented to the frusto-conical valve seat and is continuously resurfaced by operation of the valve. Accordingly, the life of the washer 56 is lengthened considerably in addition to improvement in sealing engagement thereof with the valve seat. Alternatively, the washer 56 can be replaced with an O-ring valve seating member such as the O-ring 30 described above in connection with FIGURES 1–4. A weepage seal is provided between the stem portion of the handle-stem 20' and the cylindrical bore 34' of the stem housing 54 by means of O-ring 36' as described previously.

As better shown in FIGURES 6 and 7 of the drawings, the unified handle and skirt arrangement of the valve shown in FIGURE 5 also can be employed in connection with a side outlet type drain valve. In the latter arrangement of the invention, retaining lugs 60 on the handle skirt 40' are not diametrically opposed and likewise the retaining flange slots 62, as better shown in FIGURE 7 of the drawings, with the result that the handle-stem 20' of FIGURES 6 and 7 can be removed from the associated valve body 10' in only one rotative position of the handle-stem relative to the valve body.

Referring now to FIGURES 8–11 of the drawings another form of the drain valve of the invention is illustrated. The latter form of the drain valve is provided with a unique valve seat arrangement, described in detail hereinafter, and valve body 64 thereof is arranged entirely with male threads to facilitate molding or other fabrication of the valve body. The valve body 64 is provided with an octagonal nut 66 or the like and with a standard male pipe thread 68 at the inlet end of the valve body as described above in connection with FIGURE 1. The valve body 64 is provided with a side outlet 70 which in this arrangement is distended adjacent its outer end in order to accommodate a male garden hose type thread 72.

The other end of the valve body 64 likewise is provided with a standard male pipe thread 74 for cooperation with female threaded portion 76 formed in this example as an additional coaxial skirt on the handle-stem component 78 and disposed between the handle skirt 80 and the stem portion 82 of the handle-stem. This arrangement necessitates positioning the retaining flange 84 of the body member 64 adjacent the inner end of its threaded portion 74. As better shown in FIGURES 10 and 11, the retaining flange 84 is provided with a pair of non-diametrically disposed slots 86 which cooperate with detaining lugs 88 which are similarly arranged on the inward end of the handle skirt 80. The operation of the lugs 88 in cooperation with the slots 86 for retaining and removing the handle-stem from the valve body 64 is thus similar to the arrangement of these components as described with reference to FIGURE 6. It is to be understood, however, that diametrically disposed lugs and slots can be employed as illustrated in FIGURES 1–5.

The stem portion 82 of the handle-stem 78 is provided with a weepage O-ring seal 90 which is deposited in groove 92 therefor and is physically located relative to the handle thread portion 76 and the body member threaded portion 74 so that it remains in sealing engagement with the bore 94 of the body member when the aforementioned threaded portions are disengaged but the handle-stem 78 is retained in the body member by engagement of the handle skirt lugs 88 with the body member retaining flange 84.

In this arrangement of the invention, as better shown in FIGURES 8 and 9, the valve seat of the body member 64 is formed at a thickened portion 94 adjacent the inlet end of the body member by means of an O-ring 96 seated in an axially opening groove 98 formed in the body member thickened portion 94. When thus positioned, the O-ring 96 cooperates with an axially extending annular sealing flange 100 disposed on the adjacent inward end of the valve stem 82, as better shown in FIGURE 8 of the drawings. By thus disposing the O-ring 96 in a stationary position on the valve seat of the body member 64, the possibility of the O-ring being displaced by excessive water pressures as the valve stem is moved to the open position of the valve, is eliminated.

Alternatively, the valve body as shown in FIGURE 8 can be employed with a valve member provided with a conventional flat valve washer, such as the washer illustrated in FIGURES 5 and 6 or 13 of the drawings. In such case, the O-ring 96, the O-ring groove 98 and the adjacent innerperipheral lip 99 can be eliminated and a frusto-conical valve seat or the like can be provided adjacent the inward extremity of the valve body thickened portion 94. The valve seat of FIGURE 8 when thus modified is thus substantially similar to that shown in FIGURE 6 of the drawings, and the cooperative engagement thereof with a flat type washer, such as shown in FIGURE 13 is similar to that described with reference to FIGURE 5.

The weepage seal 90 is axially displaced from the annular sealing flange 100 of the valve stem such that the seal 90 remains in sealing engagement with the bore 93 of the valve body when the sealing flange and valve stem are at or adjacent the closed portion thereof relative to the valve seat O-ring 96. That is to say, the O-ring 90 is disposed so as to be removed from the outlet drain opening 102 of the valve body proper.

With reference now to FIGURE 12 of the drawings, a bipartite handle and stem assembly 104 is illustrated and is arranged in accordance with the invention for use with an O-ring valve seating arrangement such as that shown at 96–98 of FIGURE 8. In furtherance of this purpose, a snap-in stem member 106 is provided with a sealing end flange 100' and is provided generally with a shape generally similar to the stem portion of the handle assembly shown in FIGURE 8 of the drawings. The stem member 106, however, is molded separately of the handle member 108 and when separated therefrom has generally the appearance of the valve member shown in FIGURE 13 and described hereinafter. The valve member 106 therefore is provided with a tubular connection 110 which terminates in a number of resilient axially extending prongs 112. The prongs 112 are arranged for snap-in engagement with the handle member 108. For this purpose each of the prongs 112 is provided with an outwardly extending lip 114 disposed for snap-in engagement with shoulder portion 116 formed within a generally tubular, central handle support 118 extending axially through the handle member 108.

When the valve member 106 is thus positioned on the handle member 108, a circumferential flange 120 of the valve member disposed adjacent its tubular connector 106 abutts the end of the central tubular support 118 of the handle member 108. The adjacent end of the tubular member 118 is provided with a stepped circumferentially extending recess 122, which in cooperation with the stem member flange 120, forms a groove for weepage O-ring 90'. In this example, the handle and valve stem assembly 104 is otherwise generally similar to that shown in FIGURE 8 and in end elevational view is substantially identical to that shown in FIGURE 11.

In FIGURES 13 and 14 of the drawings where similar reference characters denote similar components of FIGURE 12, a modified form 124 of the valve stem portion is illustrated. The valve member 124 is secured in the same manner to the handle member 108 shown in FIGURE 12 and thus is provided with a tubular connector 106' and snap-in prongs 112' which are identical with the related components of the valve member 106 of FIGURE 12. The valve member 124, however, is provided with a conventional, flat valve washer 126 which is secured to the valve member 124 by stretching over head 128 of an integrally molded pin 130 extending axially outward from the valve member 124.

With this arrangement a handle and valve stem assembly can be arranged for use with the O-ring valve seat 96–98 of FIGURE 8 by securing the valve member 106 (FIGURE 12) to the handle member 108, or with a frusto-conical valve seat 101 (FIGURE 8) by securing the valve member 124 (FIGURES 13 and 14) to the handle member 108. Thus, the same handle member 108 can be employed, and the handle and valve stem assembly can be readily adapted for an O-ring valve seat or for use with a conventional flat washer with a minimum of molding apparatus and component parts.

From the foregoing it will be apparent that novel and efficient forms of valve mechanisms and the like have been disclosed herein. Although the valve is particularly adapted for fabrication by molding from any thermoplastic raw material, it will be apparent that fabrication is not limited to the plastic materials as generally denoted by this term, but also, depending upon the application of the invention, can be fabricated from conventional valve material such as brass. While there have been shown and described certain presently preferred embodiments of the invention together with preferred methods of practicing the same, it is to be distinctly understood that the invention is not limited thereto but may be otherwise variously embodied and practiced within the scope of the following claims.

I claim:

1. In a valve the combination comprising a generally tubular body member having a valve seating surface therein and a cylindrical portion adjacent to and communicating with said surface, a handle and stem component having its stem portion relatively closely fitted within said cylindrical portion and threadedly engaged therewith, said handle and stem component having valve seat engaging and sealing means on the inward end thereof and a skirt portion disposable coaxially of and loosely surrounding the outward end portion of said cylindrical portion and said body member, said body member having a retaining flange mounted on said outer cylindrical end portion and enclosable within said skirt portion, and releasable detent means cooperatively formed on said skirt and on said retaining flange for releasably retaining said valve stem within said cylindrical portion.

2. The combination according to claim 1 wherein said detaining means are a pair of lugs formed on said skirt portion and a similarly disposed pair of lug slots formed in said retaining flange.

3. The combination according to claim 2 wherein a pair of visual access openings are formed in said handle portion in axial alignment with said skirt lugs.

4. The combination according to claim 1 wherein said skirt portion is an axially extending continuation of the circumferential periphery of said handle portion to facilitate grasping thereof.

5. The combination according to claim 1 wherein a resilient valve seating member is mounted on said stem portion adjacent the inward end thereof, and a resilient weepage seal member is mounted on said stem portion and spaced from said seating member, said weepage seal member being closely fitted within said cylindrical portion throughout the normal operating range of movement of said stem portion therein and said weepage seal is axially spaced from said handle skirt retaining means so that said weepage seal is operatively engaged with said cylindrical portion at the point of engagement of said cooperating means.

6. The combination according to claim 1 wherein cooperating threaded portions are formed respectively on said outer cylindrical end portion and on the adjacent portion of said valve stem when said handle-stem component is operatively engaged in said valve body and said body threaded portion contains a male thread and said handle-stem threaded portion is a female-threaded skirt portion secured at one end to said handle portion and disposed intermediately of said stem portion and said first mentioned handle skirt portion.

7. The combination according to claim 6 wherein said retaining flange is positioned for engagement by said threaded skirt portion at a closed position of said valve.

8. The combination according to claim 6 wherein said retaining flange is disposed on said body member at a position intermediate said threaded skirt portion and the detent means on said handle skirt so that one side surface of said flange serves as stop means for said threaded skirt portion at a closed position of said valve and the other side surface of said flange serves as stop means for said skirt detent means.

9. A handle and valve stem assembly shaped for insertion into a generally cylindrical valve body bore, said assembly comprising a central tubular stem member shaped for closely fitting insertion into said bore, a valve seat engaging means mounted on said tubular member adjacent one end thereof, a handle portion including a handle skirt secured to said tubular member adjacent the other end thereof and surrounding the adjacent end portion thereof, said handle skirt being spaced radially outwardly of said tubular member end portion and also outwardly of said valve body when said tubular member is inserted into the bore therein so that a compact valve structure is attained, alignment lug means positioned on the inner surface of said skirt, and visual access means formed in said handle portion in alignment with said lug means.

10. The combination according to claim 9 wherein a female-threaded skirt member is secured to said assembly and is spaced between said handle skirt and said tubular member so that said assembly can be threadedly engaged with a male-threaded end portion of said body member.

11. A handle and valve stem assembly shaped for insertion into a generally cylindrical valve body bore, said assembly comprising a central tubular stem member shaped for closely fitting insertion into said bore, valve seat engaging means mounted on said tubular member adjacent one end thereof, and a handle skirt secured to said tubular member adjacent the other end thereof and surrounding the adjacent end portion thereof, said handle skirt being spaced radially outwardly of said tubular member end portion and also outwardly of said valve body when said tubular member is inserted into the bore therein so that a compact valve structure is attained, a valve seat engaging tubular end portion of said tubular stem member being severable from the remainder thereof and being secured thereto by quick attach means, said severable stem end portion having valve seat engaging means thereon so that said assembly can selectively be provided with one of a number of severable stem portions having valve seat engaging means of respectively differing character thereon, said quick attach means including a number of longitudinally extending resilient prongs secured to said severable stem end portion and shaped for snap-in engagement with a complementarily shaped inner surface of said tubular stem member.

12. The combination according to claim 11 wherein one of said stem portions and said handle member is provided with a circumferentially extending stepped recess at the junction therebetween, and co-extending weepage sealing means are seated in said recess and are secured therein by operation of said quick attach means to engage said stem portion with said handle member.

References Cited

UNITED STATES PATENTS

| | | | |
|---|---|---|---|
| 1,228,585 | 6/1917 | Mueller et al. | 251—284 X |
| 1,406,748 | 2/1922 | Massip | 251—285 X |
| 2,194,961 | 3/1940 | Walker | 251—357 X |
| 2,621,677 | 12/1952 | Curtis | 251—215 |
| 2,895,495 | 7/1959 | Bryant | 251—333 |
| 3,338,549 | 8/1967 | Anthes et al. | 251—284 X |

FOREIGN PATENTS 924,710  5/1963  Great Britain.

ALAN COHAN, *Primary Examiner.*

DAVID R. MATTHEWS, *Assistant Examiner.*

U.S. Cl. X.R.

251—288, 324, 292; 137—315; 29—157.1, 407